(12) United States Patent
Harris et al.

(10) Patent No.: US 8,429,457 B2
(45) Date of Patent: Apr. 23, 2013

(54) USE OF STATISTICAL REPRESENTATIONS OF TRAFFIC FLOW IN A DATA PROCESSING SYSTEM

(75) Inventors: Antony John Harris, Hope Valley (GB); Simon Crossley, Sheffield (GB); Alistair Crone Bruce, Stockport (GB)

(73) Assignee: ARM Limited, Cambridge (GB)

( * ) Notice: Subject to any disclaimer, the term of this patent is extended or adjusted under 35 U.S.C. 154(b) by 595 days.

(21) Appl. No.: 12/654,153

(22) Filed: Dec. 11, 2009

(65) Prior Publication Data

US 2011/0145646 A1 Jun. 16, 2011

(30) Foreign Application Priority Data

Dec. 11, 2008 (GB) .................................. 0822618.5

(51) Int. Cl.
*G06F 11/30* (2006.01)
*G06F 11/00* (2006.01)

(52) U.S. Cl.
USPC ................ 714/32; 714/25; 714/37; 714/47.1

(58) Field of Classification Search .................... 714/25, 714/27, 28, 32, 33, 37, 39, 45, 47.1, 47.3
See application file for complete search history.

(56) References Cited

U.S. PATENT DOCUMENTS

| | | | |
|---|---|---|---|
| 5,752,002 A | 5/1998 | Naidu et al. | |
| 5,845,064 A * | 12/1998 | Huggins | 714/33 |
| 6,647,513 B1 * | 11/2003 | Hekmatpour | 714/37 |
| 6,792,377 B1 * | 9/2004 | Agrawal et al. | 714/33 |
| 2003/0172177 A1 | 9/2003 | Kersley | |
| 2004/0064293 A1 | 4/2004 | Hamilton et al. | |
| 2005/0165597 A1 | 7/2005 | Nightingale | |
| 2007/0094562 A1 | 4/2007 | Bingham | |
| 2009/0193296 A1 * | 7/2009 | Kellington et al. | 714/33 |

FOREIGN PATENT DOCUMENTS

| | | |
|---|---|---|
| GB | 2 450 130 | 12/2008 |
| JP | 2006-48525 | 2/2006 |
| JP | 2006-129533 | 5/2006 |
| WO | WO 2008/064122 | 5/2008 |

OTHER PUBLICATIONS

UK Search Report for GB0822618.5, dated Mar. 16, 2009.
UK Search Report for GB0822618.5, dated Jun. 10, 2009.

(Continued)

*Primary Examiner* — Scott Baderman
*Assistant Examiner* — Joseph D Manoskey
(74) *Attorney, Agent, or Firm* — Nixon & Vanderhye P.C.

(57) ABSTRACT

An apparatus and method are provided for performing verification tests for a design of a data processing system. The apparatus comprises a system under verification representing at least part of the design of the data processing system, and a transactor for connecting to an interface of the system under verification, and for generating signals for input to the system under verification via the interface during performance of the verification tests. Profile storage stores a profile providing a statistical representation of desired traffic flow at the interface, the statistical representation providing statistical information for a plurality of traffic attributes and also identifying at least one dependency between such traffic attributes. The transactor then references the profile in order to determine the signals to be generated, such that the signals generated take account of the specified dependencies identified in the profile. Such a mechanism enables the transactor to more realistically replicate the traffic flow that will be observed in the real system. Another aspect to the present invention provides a mechanism for generating such profiles.

19 Claims, 14 Drawing Sheets

OTHER PUBLICATIONS

Lu, Zhonghai et al., "Traffic Configuration for Evaluating Networks on Chips", Laboratory of Electronics and Computer Systems, 6 pages.

Scherrer, Antoine et al., Analysis and Synthesis of Cycle-Accurate On-Chip Traffic with Long-Range-Dependence, Laboratoire De L'Informatique Du Parallelisme, Research Report No. 2005-53, (Nov. 2005), 11 pages.

Japanese First Office Action dated Jan. 22, 2013 in JP 2009-280883.

* cited by examiner

XML representation of profile:

```xml
<profile>
    <hist name="length">
        <bin x_value="1">6</bin>
        <bin x_value="2">2</bin>
        <bin x_value="4">12</bin>
            <hist name="direction">
                <bin x_value="read">10</bin>
                    <hist name="type">
                        <bin x_value="incr">7</bin>
                        <bin x_value="wrap">8</bin>
                    </hist>
                <bin x_value="write">6</bin>
                    <hist name="type">
                        <bin x_value="wrap">1</bin>
                    </hist>
            </hist>
        <bin x_value="5">1</bin>
        <bin x_value="8">5</bin>
            <hist name="direction">
                <bin x_value="read">1</bin>
                    <hist name="type">
                        <bin x_value="incr">1</bin>
                    </hist>
            </hist>
    </hist>
</profile>
```

FIG. 3C

USE OF STATISTICAL REPRESENTATIONS OF TRAFFIC FLOW IN A DATA PROCESSING SYSTEM

This application claims priority to GB Application No. 0822618.5 filed 11 Dec. 2008, the entire contents of which is incorporated herein by reference.

BACKGROUND OF THE INVENTION

1. Field of the Invention

The present invention relates to the use of statistical representations of traffic flow in a data processing system, such as during the performance of verification tests for a design of the data processing system.

2. Description of the Prior Art

The ability to effectively and efficiently test and/or validate designs is becoming increasingly important. Typical data processing system designs are rapidly increasing in complexity and furthermore are including circuit blocks designed by a variety of different sources or companies. So called System-on-Chip (SoC) designs that integrate a large number of components on a single integrated circuit have strong advantages in terms of cost and performance, but require significant amounts of validation and testing before the designs can be reliably released for manufacture. Such validation and testing may be performed in respect of the entire design of the data processing system, or in relation to one or more particular components intended for use within the data processing system, for example particular master devices, particular slave devices, interconnect components, etc.

This validation and testing requirement is becoming a bottleneck in getting new systems into the market place. Consequently, measures that can improve the efficiency and effectiveness of such validation and testing of designs are strongly advantageous.

One known approach that can be used to seek to validate the design of a data processing system is to construct a system under verification (SUV) representing at least a part of the design of the data processing system that is to be tested. The SUV can take a variety forms dependent on the verification execution environment in which that SUV is formed. For example the verification execution environment may be implemented using a simulator tool, in which event the one or more components included within the SUV will typically take the form of software models. Alternatively, the verification execution environment may be provided by an emulator, which may for example provide synthesizable hardware on a FPGA (field programmable gate array) platform. In this embodiment, the various components can be viewed as hardware models of the final intended components, but are not the final hardware implementation themselves. In yet another alternative embodiment, the verification execution environment may be provided as an ASIC implementation, in effect providing the system under verification as a full silicon implementation (this latter approach may for example be useful when seeking to perform verification tests on the software running on the hardware platform).

However the SUV is formed, sequences of verification tests can then be performed upon the SUV to cause various transactions to take place between different portions of the system in order to test correct operation (either at the hardware or the software level), each transaction defining one or more transfers between specified portions of the system. Ideally, the behaviour of the SUV should follow as closely as possible the behaviour of the part of the data processing system represented by that SUV. However, this can prove costly both in the time taken to develop the various components to be included in the SUV, and in developing the verification tests to be performed. For example, detailed functional models can be developed for the various components of the SUV which seek to replicate what the real components would do in a real system, and indeed in some SUVs the real components themselves may be used. However, significant development effort is required to produce such functional models, and further, depending on the stage of development during which the verification tests are performed, the actual real components may not be available.

Considering the verification tests themselves, another factor that contributes significantly to the complexity and cost of performing verification tests is the development of suitable transaction sequences to be executed during the verification tests. Detailed test vectors can be written seeking to define specific lists of transactions seeking to replicate the activities that would be observed in the real system, but such detailed lists of vectors take a long time to prepare, and indeed take a long time to execute within the SUV. Further, such text vectors can be difficult to deploy in emulation or ASIC environments due to their large storage requirements.

Accordingly, with the aim of reducing such complexities, another testing approach which has been developed involves the use of transactors to represent one or more components in the SUV, a transactor being a simplified model which can be viewed externally as modelling the same hardware elements as the component(s) which it is substituted for, but which internally is significantly simplified. As an example, whereas a functional model might be developed to represent a particular type of CPU, this can be replaced by a transactor representing a generic master device. Such a transactor can then be arranged to generate random patterns of transfers constrained by a user configuration file, such an approach often being referred to as constrained random testing. One example of a transactor is an eXtensible Verification Component (XVC), and often a number of XVCs may be substituted into the design, with the test actions for separate XVCs being coordinated by a test manager.

Typically, the way in which transfers constituting different transactions are created and handled within the system will be controlled by a transaction protocol. A user configuration file can be used to constrain the random testing so that any transfers issued by the transactor conform to the transaction protocol. Accordingly, the constrained random testing approach can be used to generate a large number of random transfers conforming to the transaction protocol. Further, the transactor can be arranged to execute one or more directed format vectors in order to efficiently verify corner cases (i.e. problems or situations that occur only outside normal operating parameters) in a system design.

By using transactors in the manner described above, this can enable thorough testing of interfaces within the SUV with significantly less complexity and cost than the earlier-mentioned prior techniques employing functional models or detailed test vectors. However, such transactors do not seek to behave in an equivalent way to the components which they have replaced in the design, and accordingly the use of such transactors suffers from a number of drawbacks.

The traffic flow that occurs as a result of constrained random testing using a transactor is not representative of that which will occur between the component(s) represented by the transactor and the SUV in the real system, and accordingly optimisation or performance measuring is not possible. Further, it can be difficult to reach specifically desired coverage points based solely on constrained random testing, due in part to the large protocol space associated with modern transaction protocols such as AXI. Furthermore constraining the random testing in some meaningful way is difficult to achieve in a readily visible manner, and constraints are usually hardcoded into the transactor, thus increasing complexity and cost of the testing procedure.

A number of papers have been written that describe traffic generation driven by a stochastic model (i.e. a model that approximates the behaviour of a real component using random parameters). For example, the article "Traffic Configuration for Evaluating Networks on Chips", by Z Lu et al, iwsoc, pages 535 to 540, Fifth International Workshop on System-on-Chip for Real-Time Applications (IWSOC'05, 2005), describes a traffic configuration tree used to capture the spatial distribution, temporal characteristics and message size specifications of a single communication channel, such a channel being a logical path from a source node to a destination node. These properties are captured as statistical aggregations. This representation is then used to generate synthetic network traffic based on estimates of a how a processing element may perform.

The article "Analysis and Synthesis of Cycle-Accurate On-Chip Traffic with Long-Range Dependence", by A. Scherrer et al, Technical Report 2005-53, LIP, ENS-Lyon, Dec. 2005, describes a methodology for extracting statistical attributes on-chip traffic from a VCD (Value Change Dump) waveform (a VCD being a form of activity reference list) in order to drive a synthetic trace generator.

The Verification Methodology Manual for System Verilog (VMM) describes random scenario generation, where each scenario has a hard coded set of weights to use for generation. Different distributions can be maintained for each attribute.

Whilst the various techniques described above provide various approaches for synthetic traffic generation, a problem still exists that when a transactor is used to interface with a system under verification in order to cause such synthetic traffic to be generated, that traffic is still not closely representative of the traffic that would actually occur in the real system and so is not useful for performance evaluation and optimisation.

SUMMARY OF THE INVENTION

Viewed from a first aspect, the present invention provides an apparatus for performing verification tests for a design of a data processing system, the apparatus comprising: a system under verification representing at least part of the design of the data processing system; a transactor for connecting to an interface of the system under verification, and for generating signals for input to the system under verification via said interface during performance of said verification tests; profile storage for storing a profile providing a statistical representation of desired traffic flow at said interface, the statistical representation providing statistical information for a plurality of traffic attributes and identifying at least one dependency between traffic attributes in said plurality; and the transactor referencing said profile in order to determine the signals to be generated, such that the signals generated take account of said at least one dependency identified in the profile.

The inventors of the present invention observed that in practice there are dependencies between various traffic attributes resulting from the transaction protocol used to define allowable transactions. For example, there will often be various transaction protocol attributes defined by the transaction protocol, and these transaction protocol attributes can be considered to be examples of traffic attributes. Dependencies may be defined between these transaction protocol attributes dependent on the transaction protocol used. For example, considering AXI, one specific example of a dependency that may exist is that read transactions with a burst type attribute of "WRAP4" which originate from a cache linefill request will also have a cacheability/bufferability attribute of "cacheable". Another example of traffic attributes where dependencies may occur are timing attributes identifying timing between particular traffic signals produced in accordance with the transaction protocol.

Further, the inventors of the present invention realised that all of the known techniques for providing statistical representations of traffic flow capture no dependencies between the traffic attributes in those statistical representations. As a result, if such known statistical representations are used to control the signals produced by a transactor when coupled to a system under verification, this can lead to gross inaccuracies in the generated signals when compared with the signals that will actually be produced in a real system. Further, based purely on the statistical representations provided, the transactor would be able to generate signals which are actually illegal having regards to the transaction protocol, and accordingly it would be necessary to explicitly define illegal protocol combinations (typically via constraints that are hardcoded into the transactor) in order to avoid such illegal transfers being generated. Further, when using such flat statistical representations of traffic flow within a large protocol space, it is difficult to constrain transactor behaviour sufficiently to direct the testing towards interesting coverage points.

Based on these observations, the inventors of the present invention decided to develop a profile which could be referenced by the transactor when determining signals to be generated, with that profile providing a statistical representation of desired traffic flow at the interface between the transactor and the SUV, and with the statistical representation in the profile providing not only statistical information for a plurality of traffic attributes but also identifying at least one dependency between traffic attributes. As a result, when the transactor references the profile, the signals generated take account of the specified at least one dependency identified in the profile. Thus, the transactor can be used to produce constrained random traffic that is much closer in nature to that which would be observed in the real system.

Further, since at least one dependency between traffic attributes is captured in the profile, there is less likelihood of the transactor generating illegal transactions, and hence there is less work needed to explicitly define illegal protocol combinations that the transactor needs to avoid. Further, rather than producing verification tests which seek to cover the entirety of the protocol state space, by taking account of the at least one dependency identified in the profile, the activities of the transactor can be focused on that portion of the protocol's state space that is actually likely to be exercised by the real system.

Through use of this invention, the applicability of transactors in test procedures can be broadened. Whereas previously transactors provided a relatively cheap mechanism for performing certain verification tests, but were never intended to mimic the functionality of real components, and instead functional models were used for any testing where such functionality was required, transactors can now be used as a much cheaper alternative to functional models in certain situations, even where there is a need for certain functionality of the real system to be replicated. In particular, since the profile captures not only statistical information for a plurality of traffic attributes, but also at least one dependency between traffic attributes, the transactor can produce a much more realistic sequence of signals replicating more closely the traffic flow that would arise in a real system.

It should also be noted that such an approach provides a much improved level of security for those parties involved in shipping functional models of components to third parties to enable those third parties to perform testing. In particular, instead of shipping a functional model, it will be possible to ship a transactor, optionally with one or more profiles to be run by that transactor, to enable that third party to perform similar tests, but without exposing any of the internal functionality of the component which might otherwise be exposed via shipping of a functional model. In particular, through use of a transactor and a profile that takes account of dependencies between traffic attributes, only the behaviour of the component at the interface is exposed to the third party, and nothing can be deduced about the internal structure and behaviour of the component.

The profile can be arranged in a variety of ways. However, in one embodiment the profile employs a hierarchical structure to identify said at least one dependency within said statistical representation of desired traffic flow. The hierarchical structure can take a variety of forms, but in one embodiment the hierarchical structure is a hierarchical structure of histograms, each histogram providing statistical information for one of said traffic attributes. Hence, purely for the purposes of illustration, it can be seen that if the traffic attributes identified in the profile include burst length, burst type and cacheability/bufferability attributes of each access request, then if burst type is defined as being dependent on burst length, and cacheability/bufferability is defined as being dependent on burst type, histograms can be developed for each of these traffic attributes taking account of the defined dependencies. Hence, different burst type histograms can be produced for each possible burst length, and similarly for each burst type histogram, different cacheability/bufferability histograms can be generated for each burst type captured in that histogram. By such an approach, when access requests are generated by the transactor having regards to the profile, the burst length, burst type and cacheability/bufferability attributes of each such access request will be generated taking account of the hierarchical structure so as to ensure the dependencies between those traffic attributes are taken into account, thereby constraining the choices of those attributes as dictated by the hierarchical structure.

The desired traffic flow at the interface that is represented by the statistical representation in the profile can take a variety of forms. However, in one embodiment, the desired traffic flow is representative of a traffic flow that would be expected to be observed at said interface if the transactor were replaced with a functional model or an actual component of the data processing system. Functional models might take a variety of forms, for example a Register Transfer Level (RTL) model, a cycle approximate (CX) model, etc. The ability to use the transactor instead of such a functional model or the actual component, whilst still being able to simulate such desired traffic flows, significantly reduces the complexity and cost of performing the verification tests.

There are a number of ways in which the statistical representation of desired traffic flow can be obtained. For example, the profile could be defined manually by a user based on knowledge of desired traffic flow. However, in an alternative embodiment, the statistical representation of desired traffic flow is obtained by monitoring traffic flow occurring when said functional model or said actual component is used. As discussed earlier, the functional model can take a variety of forms, but is intended to be a model that will replicate the full transfer functions of the actual component being modelled.

An RTL model or a CX model would be suitable examples of functional models whose traffic flow could be monitored in order to produce the statistical representation of desired traffic flow.

The traffic attributes for which the profile provides the statistical information may take a variety of forms. In one embodiment, the traffic flow is produced in accordance with a transaction protocol and said plurality of traffic attributes comprise at least one transaction protocol attribute. Particular examples of such transaction protocol attributes would be burst length, burst type, cacheability/bufferability attributes, etc as discussed earlier.

However, the traffic attributes that the profile can provide statistical information for are not restricted to transaction protocol attributes. Instead, in one embodiment the plurality of traffic attributes may instead, or additionally, comprise at least one timing attribute identifying timing between particular traffic signals produced in accordance with the transaction protocol. An example of such a timing attribute would be a wait state count identifying the number of cycles between beats of data. By capturing both transaction protocol attributes and timing attributes within the profile, along with one or more dependencies between those attributes, the transactor is able to generate traffic that provides a very realistic estimation of the traffic that might be observed in the real system or when using a detailed functional model to model the relevant component in the system. Further, capturing inter-transaction timing gives an indication of the relative bandwidths of multiple flows within a profile.

Whilst in accordance with the above first aspect of the present invention, the invention concerns the use of a profile providing statistical information for a plurality of traffic attributes and identifying at least one dependency between those traffic attributes in order to drive a transactor, in accordance with a second aspect of the present invention a technique is provided for generating such profiles. In particular, in accordance with a second aspect of the present invention, there is provided an apparatus for generating a profile providing a statistical representation of traffic flow within a data processing system, the apparatus comprising: a system under verification representing at least part of the design of the data processing system; a monitor for connecting to an interface of the system under verification, and for observing the traffic flow at that interface; the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependencies between traffic attributes in said plurality.

Accordingly, in the second aspect of the present invention, a monitor receives control inputs specifying a plurality of traffic attributes and at least one dependency between those traffic attributes, and is then arranged to monitor traffic flow at an interface within a system under verification in order to produce a profile of that observed traffic flow. Due to the control inputs provided to the monitor, that profile provides statistical information for the identified traffic attributes and also captures the specified dependencies between the traffic attributes.

Such an approach provides a particularly efficient mechanism for producing profiles in accordance with the present invention. The control input provided to the monitor can take a variety of forms. In one embodiment, the control input takes the form of a profile template setting out the plurality of traffic attributes and said at least one dependency, and the monitor produces said profile by populating the profile template based on the observed traffic flow.

Hence, such a template may for example specify a hierarchical structure of histograms, with those histograms initially being empty, and with the monitor then populating those histograms based on the observed traffic flow.

In an alternative embodiment, the control input takes the form of an initial profile setting out the plurality of traffic attributes and said at least one dependency, and at least partially populated with statistical information, and the monitor produces said profile by supplementing the statistical information in the initial profile based on the observed traffic flow.

Hence, in this embodiment a partially populated profile template is used as a starting point, and the monitor then supplements the statistical information based on the observed traffic flow. Through the use of empty profile templates or partially populated initial profiles, profiles can be provided covering various useful hierarchical topologies, such as ID or address-driven dependencies. Further, considering the example of a company developing a component for a SoC, for example a processor, that company can provide to a third party a modelling component that can be used by the third party to model that processor, where that modelling component takes the form of a transactor and one or more representative profiles, with the company using its detailed knowledge of the processor to deliver representative and accurate profile templates or partially populated initial profiles for the third party to then use in its verification tests.

Whilst one intended use of such profiles is as an input to a transactor, the inventors of the present invention realised that such profiles can also be used for other purposes. In particular, another problem that arises when verifying designs of a data processing system is when comparing the performance or behaviour of multiple views of that design that are subtly different, for example an RTL model view verses a cycle approximate model view or an emulation view. The inventors of the present invention determined that through use of the profiles of the present invention, and in particular the more accurate and robust statistical representation achieved by capturing dependencies between traffic attributes, a more accurate comparison can be made between such multiple views of the design. In particular, in one embodiment, comparison logic can be used for comparing the profile produced by the monitor with an additional profile generated for an alternative representation of the data processing system, the additional profile also providing statistical information for said plurality of traffic attributes and identifying said at least one dependency between traffic attributes in said plurality. By comparing two profiles that both capture dependencies between traffic attributes, subtle differences between the profiles can be identified that would not be evident from a flat statistical representation of traffic attributes. Purely by way of example, flat statistical representations for an RTL model of a CPU and a cycle approximate model of a CPU may both identify burst length and burst type statistical information that looks similar. However, if using the profiles of the present invention, and for example identifying that burst type is dependent upon burst length, then subtle differences in burst type can be unearthed for different burst lengths which would be completely hidden if flat statistical information were collected.

The alternative representation of the data processing system with which the profile produced by the monitor is compared may be produced in a variety of ways. However, in one embodiment the apparatus may further comprise: an alternative system under verification representing at least part of the design of the data processing system, the alternative system under verification being a different implementation of the data processing system to the system under verification; the monitor connecting to an equivalent interface within said alternative system under verification, and observing the traffic flow at that equivalent interface in order to produce an additional profile; and the comparison logic comparing the profile and said additional profile in order to determine differences between operation of the system under verification and the alternative system under verification. Hence, in this embodiment, the monitor is first connected to the system under verification in order to produce a first profile, and is then connected to the alternative system under verification in order to produce a second profile, and the comparison logic then compares the first and second profiles in order to determine differences between operations of the two SUVs. The profiles can also be used to visualise the performance of various aspects of a traffic flow.

Another potential application for the profiles of the present invention is in the area of error detection in a system under verification. In particular, if a profile is produced in accordance with the present invention to capture the expected traffic behaviour at an interface in a system, then error detection circuitry can be coupled to the equivalent interface in a system under verification in order to observe the actual traffic flow that occurs in that system under verification. The error detection circuitry can then be arranged to also have access to the profile generated in accordance with the present invention, and can be arranged to generate an error signal when the traffic flow observed is unexpected having regards to the profile.

Since the profiles of the present invention capture not only desired traffic attributes, but also dependencies between the traffic attributes, they can provide a very realistic view of the traffic that should be expected in a correct system. If there is a miss match between the traffic flow expected having regards to the profile and the traffic flow that actually occurs in a system under verification, an error can be flagged indicating that the system under verification is behaving incorrectly.

The system under verification in such situations can take a variety of forms. Whilst it may be a model of a desired data processing system, it can also in some embodiments be the final data processing system itself, with the error detection circuitry being used to detect any undesirable system behaviour from whatever cause, whether that be software bugs or hardware failure.

Viewed from a third aspect, the present invention provides a method of performing verification tests for a design of a data processing system, the method comprising the steps of: providing a system under verification representing at least part of the design of the data processing system; connecting a transactor to an interface of the system under verification; during performance of said verification tests, inputting to the system under verification, via said interface, signals generated by the transactor; storing within profile storage a profile providing a statistical representation of desired traffic flow at said interface, the statistical representation providing statistical information for a plurality of traffic attributes and identifying at least one dependency between traffic attributes in said plurality; and causing the transactor to reference said profile in order to determine the signals to be generated for input to the system under verification, such that the signals generated take account of said at least one dependency identified in the profile.

Viewed from a fourth aspect, the present invention provides a method of generating a profile providing a statistical representation of traffic flow within a data processing system, the method comprising the steps of: providing a system under verification representing at least part of the design of the data processing system; connecting a monitor to an interface of the system under verification; observing, via the monitor, the traffic flow at that interface; and responsive to a control input specifying a plurality of traffic attributes and at least one dependency between traffic attributes in said plurality, causing the monitor to produce said profile based on the observed traffic flow, the statistical representation of said profile providing statistical information for said plurality of traffic attributes and identifying said at least one dependency between traffic attributes in said plurality.

Viewed from a fifth aspect, the present invention provides a computer program product comprising a computer program which when executed on a computer causes the computer to perform either the method of the third aspect of the present invention or the method of the fourth aspect of the present invention.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3B and 3C illustrate a profile employing a hierarchical structure to identify dependencies within a statistical representation of traffic flow in accordance with one embodiment of the present invention;

DESCRIPTION OF EMBODIMENTS

Figure 1:
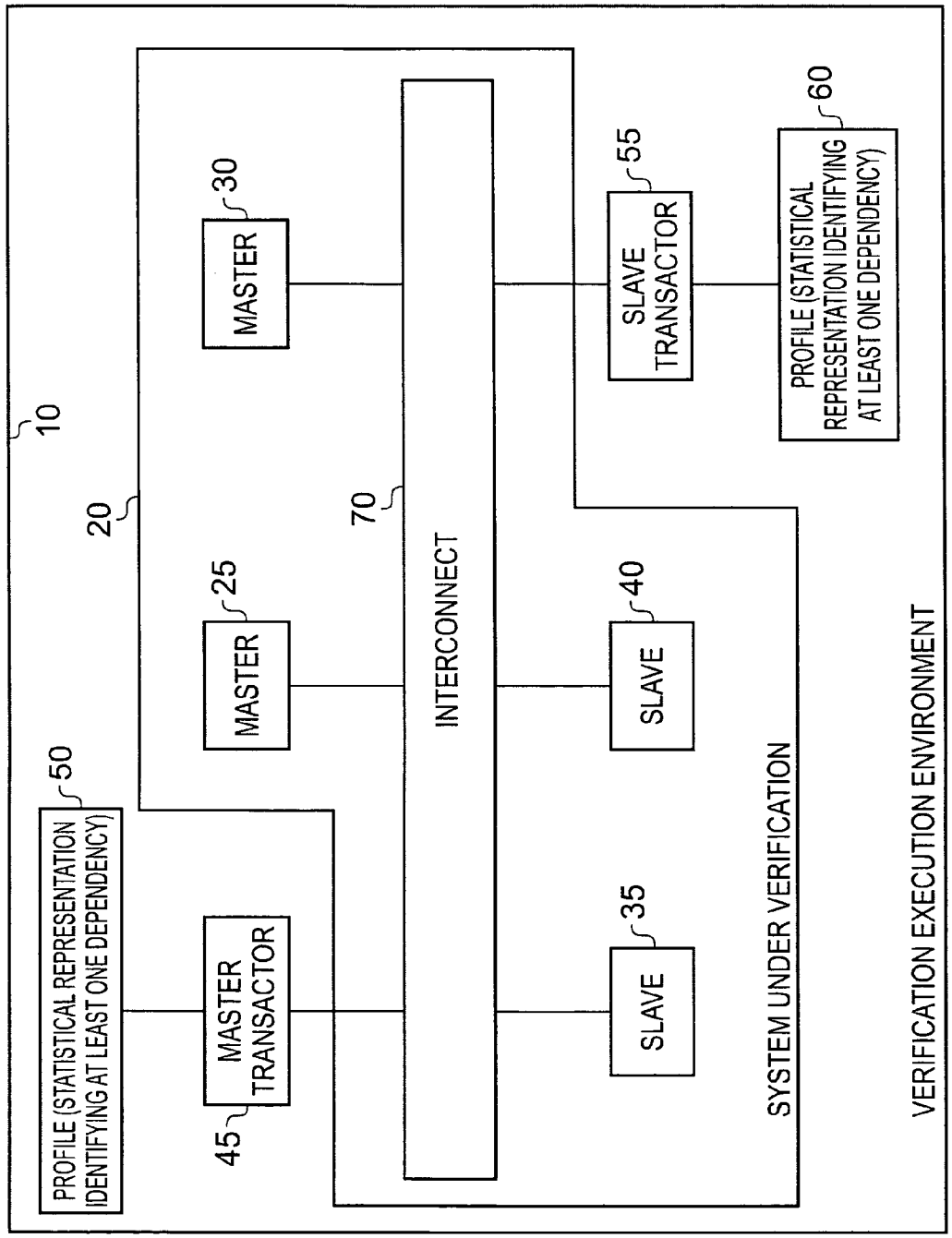
FIG. 1 is a block diagram showing the components within a verification execution environment in accordance with one embodiment of the present invention.

FIG. 1 is a block diagram schematically illustrating the components provided within a verification execution environment 10 in accordance with one embodiment of the present invention. Within the verification execution environment, a system under verification (SUV) 20 is provided representing at least part of the design of a data processing system that is to be tested. The verification execution environment and SUV can take a variety of forms. For example, the verification execution environment may be implemented using a simulator tool, in which event the one or more components included within the SUV will typically take the form of software models. Alternatively, the verification execution environment may be provided by an emulator, for example providing synthesizable hardware, and in this case the SUV components can be viewed as hardware models of the final intended components, but are not the final hardware implementations themselves. In another alternative embodiment, the verification execution environment may be provided as an ASIC implementation, in effect providing the SUV as a full silicon implementation.

In the example illustrated in FIG. 1, the SUV includes a number of master components 25, 30 coupled via an interconnect component 70 with a number of slave components 35, 40. Although there are a number of ways in which the interconnect 70 may be arranged to allow communication between the various connected components, in one embodiment the interconnect 70 employs a point-to-point request/response channel structure.

In the following description, a "connection" will be used to describe the physical link which enables two components to communicate. For example, an AMBA connection comprises a master interface, a slave interface and an interconnect. A connection comprises one or more "channels" that are related in some fashion, but may be in different directions (i.e. some channels will pass from the master to the slave, whilst other channels will pass from the slave to the master). These inter-channel dependencies are described as attributes of the connection. Unrelated channels would be considered as part of two connections.

A "channel" is a set of signals and interfaces that forms a unidirectional communication. Each channel has exactly one source and one or more sinks, i.e. it may be a multicast channel. Channels form a subset of a connection, and hence by way of example an AXI read connection has two channels (a read address channel and a read data channel) and an AXI write connection has three channels (a write address channel, a write data channel and a write response channel). A channel has one or more "traffic flows".

A "traffic flow" is an effectively independent communication over a channel. The traffic flow describes the payload communicated across a channel and may be further categorised as data flow or control flow, depending on its payload. If two or more traffic flows share a single channel, they could be described as a single flow with the combined attributes of both.

The SUV shown in FIG. 1 will enable certain connections and channels to be accessed during performance of verification tests in order to evaluate the correct operation of its hardware and associated software elements. To assist in the performance of verification tests, one or more transactors 45, 55 are connected to interfaces of the SUV, and are used to generate signals for input to the SUV during performance of the verification tests. As shown in FIG. 1, the transactors can be master transactors used to initiate transactions by inputting stimulus signals into the SUV, each transaction defining one or more transfers between specified components. Further, the transactor may be a slave transactor 55 arranged to issue signals back into the SUV in response to transfer requests issued to it. In typical prior art systems, transactors have been used to perform constrained random testing based on a specified user configuration file, or have been used to execute one or more directed format vectors in order to verify corner cases in a system design. However, since transactors are simplified models representing generic components, for example a generic master device or a generic slave device, their use has until now been constrained to situations where it is not necessary for the transactor to behave in an equivalent way to the component which it has replaced in the design. In particular, the traffic flows that occur as a result of constrained random testing using a transactor are not representative of that which will occur between the component represented by the transactor and the SUV in a real system.

However, in accordance with embodiments of the present invention, the transactors determine the signals to be generated with reference to profiles 50, 60, each profile providing a statistical representation of desired traffic flow at the interface to which the associated transactor is coupled, with that statistical representation providing statistical information for a plurality of traffic attributes and in addition identifying at least one dependency between those traffic attributes. By capturing at least one dependency between the attributes within the statistical representation provided by the profile, it has been found that the transactor can be used to produce constrained random traffic that is much closer in nature to that that would be observed in the real system, thereby allowing transactors to be used for certain test procedures where transactors would previously have been considered inappropriate. Other benefits have also been found to stem from the use of such profiles. For example, since at least one dependency between traffic attributes is captured in the profile, there is less likelihood of the transactor generating illegal transactions than there would be using prior art constrained random testing techniques. Hence there is less effort required to explicitly define illegal protocol combinations within the transactor. Furthermore, by taking account of the specified dependencies, the activities of the transactor can be more readily focused on the portion of the protocol state space that is actually likely to be exercised in the real system, thereby reducing the verification test time.

Figure 2:
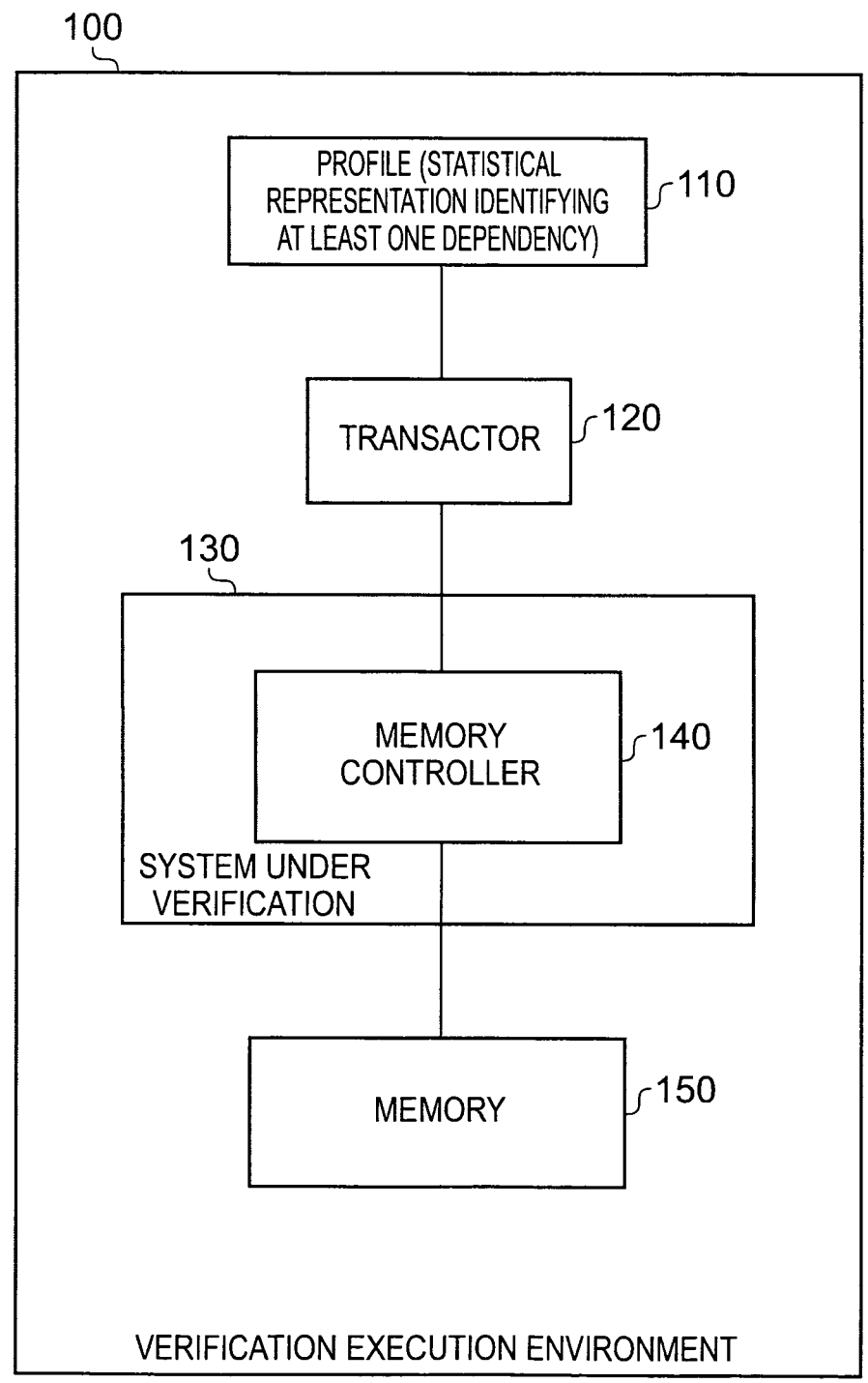
FIG. 2 is a block diagram illustrating the verification execution environment in accordance with an alternative embodiment of the present invention.

Whilst in FIG. 1, the SUV comprises a number of components connected via an interconnect, it will be appreciated that the SUV can take a variety of forms, and as shown in FIG. 2 may for example incorporate only a single component. In particular, in the example shown in FIG. 2 the SUV 130 contains a memory controller component 140 whose operation is to be verified. A master transactor 120 is driven by a profile 110 that provides not only statistical information for a plurality of traffic attributes but also at least one dependency between those attributes, enabling the transactor to issue control signals that more accurately replicate the real traffic flow that would occur between a master device and the memory controller in a real system. The memory controller component 140 is also connected to a memory component 150 to enable it to perform memory access operations in response to the signals input from the transactor 120.

The statistical representation provided by the profile can be arranged in a variety of ways. However, in one embodiment the profile employs a hierarchical structure in order to identify the one or more dependencies within the statistical representation of desired traffic flow. The hierarchical structure can take a variety of forms, but in one embodiment the hierarchical structure is a hierarchical structure of histograms, with each histogram providing statistical information for one of the traffic attributes.

Figure 3A:
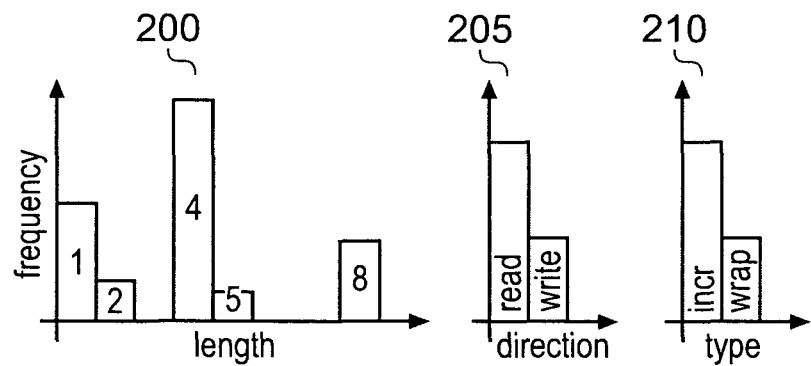
FIG. 3A illustrates a flat statistical representation of traffic flow of a prior art technique.
Figure 3B:
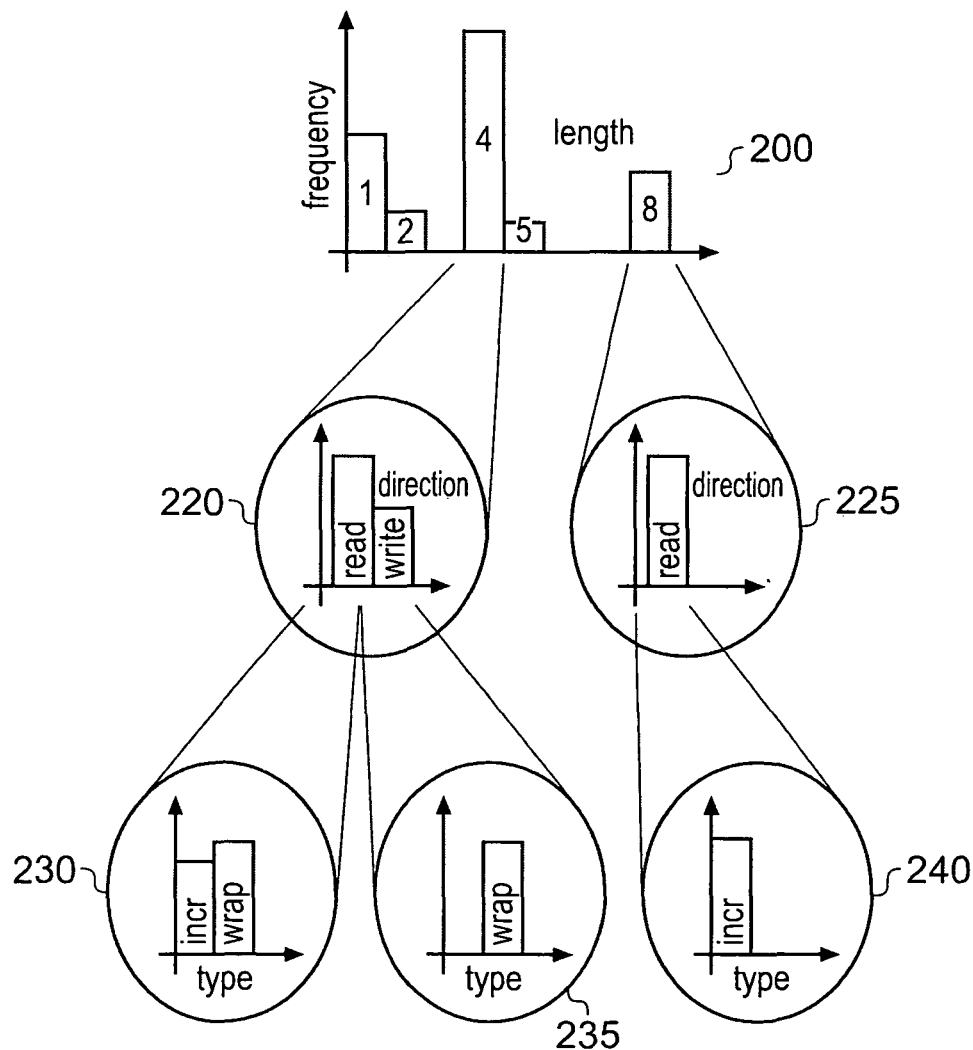

FIGS. 3A to 3C illustrate this concept in more detail. In this example, it is assumed that the transactor is to be used to model the traffic of a CPU, and three traffic attributes are to be captured within the profile, namely the transaction protocol attributes burst length, direction and burst type. If a flat statistical representation for these attributes were formed, for example by monitoring them in a real system, then the three separate histograms 200, 205, 210 for burst length, direction and burst type shown in FIG. 3A may be produced.

If this statistical information is subsequently used to generate traffic through a transactor, the transactor may well produce illegal (or unobserved) combinations of attributes and the resultant traffic will not be close to that observed in a real system. For example, the transactor may produce a transaction having a burst length of "5", a direction of "write", and a burst type of "incrementing", whereas in practice such a transaction may never occur in the real system. For example, it may be that the following information is known about transactions that would occur in a real system:

TABLE 1

| Transaction | Length (beats) | Direction | Type |
| --- | --- | --- | --- |
| Cache linefill | 4 | read | wrapping |
| Non-cacheable fetch | 1-16 | read | incrementing |
| Cache writeback | 4 | write | wrapping |

If the dependencies specified in Table 1 are captured in a hierarchical structure of histograms using the technique of embodiments of the present invention, then when monitoring the same traffic in order to generate the profile, the resultant profile produced may be as shown schematically in FIG. 3B. In this example, the burst length histogram 200 is unchanged, and is used as the primary transaction protocol attribute. For each entry in the burst length histogram, a separate direction histogram will be produced, and hence as shown by way of example, the direction histogram 220 may be produced for a burst length of 4, and the direction histogram 225 may be produced for a burst length of 8. By comparison with Table 1, it can be seen that any of the three classes of transaction may specify a burst length of 4, and hence the direction histogram is likely to include a mixture of read and write accesses, whereas a burst length of 8 can only be specified for non-cacheable fetch transactions, and these transactions will always be read transactions, and accordingly the direction histogram 225 will only include read accesses.

Similarly, for each entry in each direction histogram a separate burst type histogram will be produced. Accordingly, for the direction histogram 220, two burst type histograms 230, 235 will be produced, and similarly for the direction histogram 225, one burst type histogram 240 will be produced. Further, if timing attributes are captured, then the relative bandwidths of each transaction class can be determined.

If the profile shown schematically in FIG. 3B is referenced by the transactor in order to determine the signals that the transactor generates, the signals generated will result in traffic flow at the interface between the transactor and the SUV that much more closely represents the real traffic flow that will occur in a real system.

For completeness, FIG. 3C provides an XML representation of the profile shown in FIG. 3B. As shown, the five "bin x_values" for the length histogram identify the lengths of 1, 2, 4, 5 and 8 respectively, and indicate that their frequencies are 6, 2, 12, 1 and 5. Further, it will be seen that the direction histogram 220 for the burst length of four has read and write values of 10 and 6, respectively whilst the direction histogram 225 for the burst length of 8 only contains a read entry, which by default is set to a value of 1. It will also be seen that the three burst type histograms 230, 235 and 240 are also identified in the XML representation of FIG. 3C.

Figure 4A:
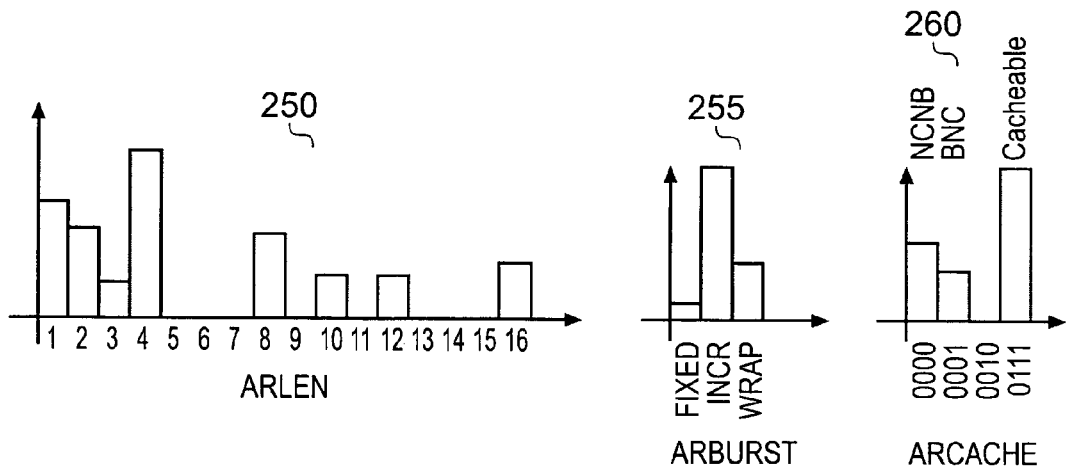
FIG. 4A illustrates a flat statistical representation of traffic flow of a prior art technique.

FIG. 4A illustrates a flat statistical representation of traffic flow that could be produced using a prior art approach for another example situation, where again three transaction protocol attributes are captured, but this time the attributes are burst length, burst type and cacheability/bufferability. ARLEN, ARBURST and ARCACHE are the names given to these transaction protocol attributes in AXI, and FIG. 4A illustrates the results that may be obtained from monitoring an AXI data flow.

Figure 4B:
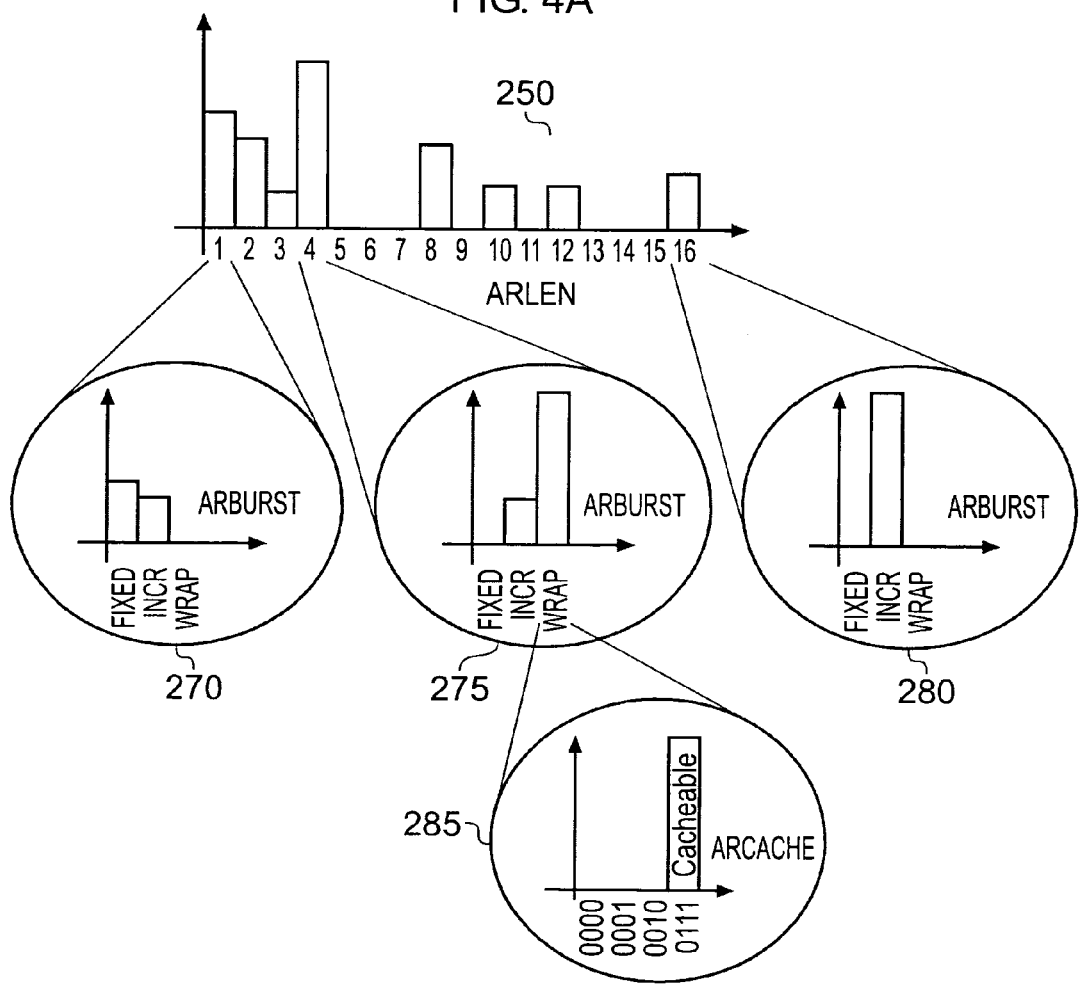
FIG. 4B illustrates a profile employing a hierarchical structure to identify dependencies within a statistical representation of traffic flow in accordance with an alternative embodiment of the present invention.

In FIG. 4B, a profile generated in accordance with an embodiment of the present invention is shown, based on the same AXI data flow but where in accordance with this embodiment, ARLEN is considered to be the primary histogram, and ARCACHE is dependent on ARBURST which is dependent on ARLEN. If the flat statistical representation shown in FIG. 4A was used to drive the transactor, it will be appreciated that very different results would be achieved when compared with a situation where the transactor is driven with the profile of embodiments of the present invention shown in FIG. 4B. For example using the independent histograms 250, 255, 260 of FIG. 4A a transaction with ARLEN of 1 and ARBURST of type WRAP could be produced. However, as is clear from FIG. 4B, and in particular the ARBURST histogram 270, this combination was not present in the original data flow, and happens to be illegal in the AXI protocol. By using the hierarchical representation shown in FIG. 4B, this problem is addressed since the transactor will never produce such a transaction.

Figure 5:
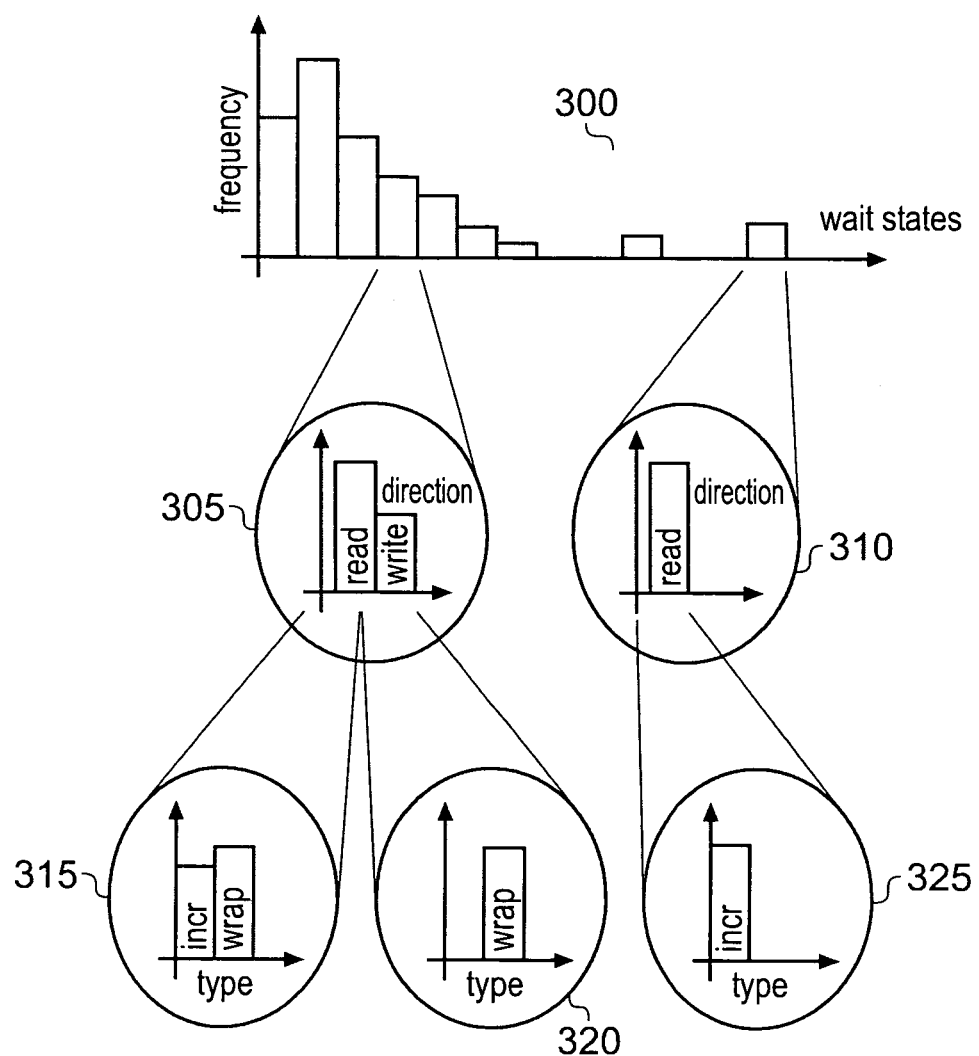
FIG. 5 illustrates a profile employing a hierarchical structure of traffic attributes in accordance with one embodiment of the present invention, where the traffic attributes include both transaction protocol attributes and timing attributes.

The hierarchy of dependencies can be defined at the time the profile is generated, for example at capture time if a monitor tool is used to generate the profile by observing traffic flow in a real system. By enabling the dependencies to be defined at capture time, it is possible to focus on the attributes of particular interest at that time. For example, at a memory controller interface, the attribute "ID" can be used to differentiate between independent flows with very different transaction protocol attributes and timing attributes. Alternatively, a user may be interested in wait states (identifying the number of cycles between beats of data), and so can use the wait state as a top level histogram in order to find out what types of transaction produce different data performances. An example where wait state is used as the top level histogram is shown in FIG. 5. As is apparent from the direction histogram 310 and the type histogram 325, high wait states occur for read transaction of burst type increment.

Figure 6:
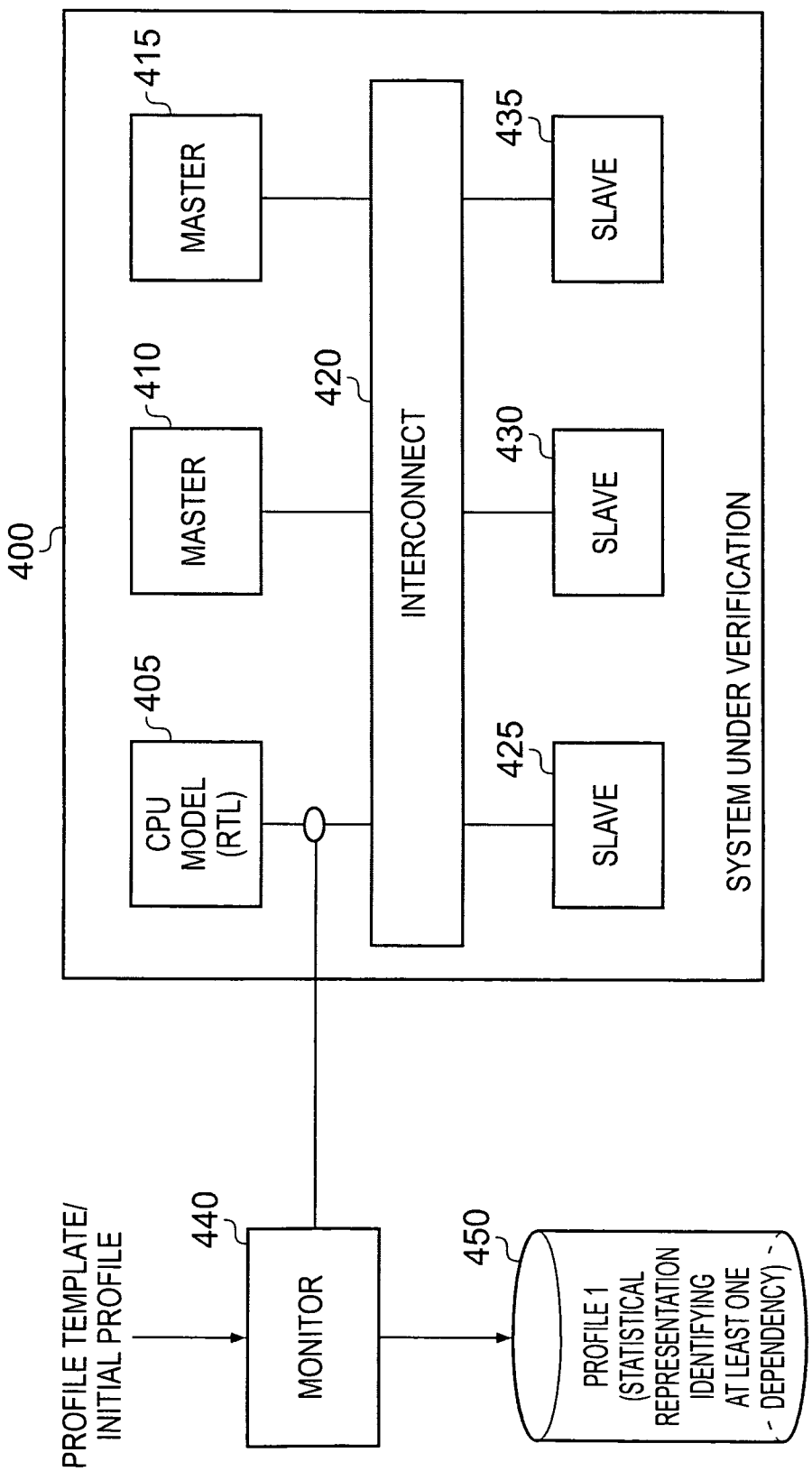
FIG. 6 is a block diagram illustrating the operation of a monitor in order to generate a profile in accordance with one embodiment of the present invention.

FIG. 6 illustrates a mechanism by which the above described profiles can be generated in accordance with one embodiment of the present invention. As shown in FIG. 6, the system under verification 400 consists of a number of master devices 405, 410, 415 coupled to a number of slave devices 425, 430, 435 via an interconnect 420. The master device 405 is formed as an RTL model of a CPU.

A monitor tool 440 is used to observe the traffic flow occurring at the interface between the RTL model 405 and the interconnect 420, and based thereon to produce a first profile 450. To enable the monitor tool 440 to produce the profile, a profile template or an initial profile is provided as an input to the monitor tool. In particular, a profile template can used defining the plurality of traffic attributes of interest, and defining the dependencies between those attributes, and the monitor tool then produces the profile by populating the profile template based on the observed traffic flow. Hence, the profile template may in one embodiment specify a hierarchical structure of histograms, with those histograms initially being empty, and with the monitor tool then populating those histograms based on the observed traffic flow.

As an alternative to using a profile template, the control input to the monitor tool 440 may take the form of an initial profile. As with a profile template, this defines the plurality of traffic attributes of interest and the dependencies between them, but is at least partially populated with statistical information. In particular, it may have been partially populated with some information entered manually, or with some information produced by monitoring a different SUV, etc. In this instance, the monitor tool then produces the profile by supplementing the statistical information in the initial profile based on the observed traffic flow.

Figure 7:
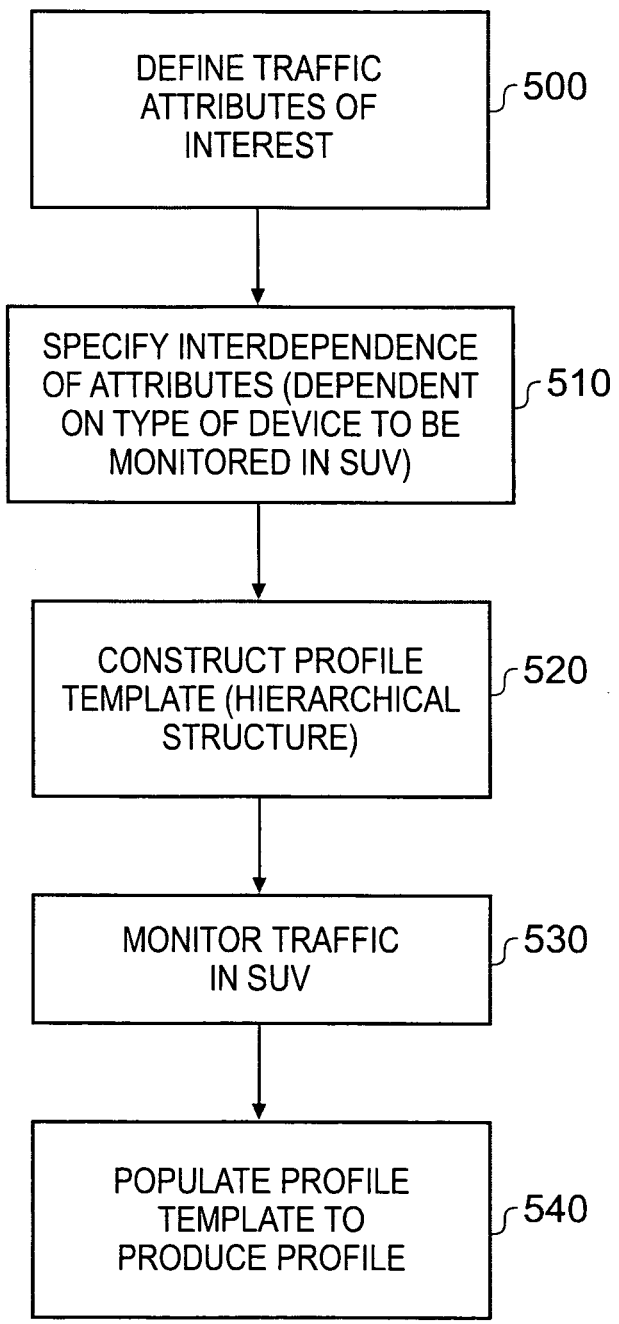
FIG. 7 is a flow diagram illustrating the steps performed in order to produce a profile in accordance with one embodiment of the present invention.

FIG. 7 is a flow diagram outlining the steps performed when using the mechanism described in FIG. 6. Firstly, at step 500 the traffic attributes of interest are defined. These may be transaction protocol attributes, timing attributes, or a mixture of the two. Thereafter, at step 510 the interdependence between the attributes is specified, this typically being dependent on the type of device to be monitored in the SUV. For example, for certain types of devices, it may be considered appropriate to choose burst length as a primary attribute, whereas for other types of device it may be appropriate to choose some other attributes. Further, the interdependencies chosen may depend not only on the type of device but also on how the profile is later to be used, for example what type of testing is to be performed using a transactor and the generated profile.

At step 520, a profile template is constructed in order to provide the hierarchical structure capturing both the traffic attributes of interest and the interdependencies. Accordingly, considering the earlier examples, the profile template may at this stage comprise the hierarchical structure of histograms, but with the histograms currently unpopulated. Steps 500 to 520 may be performed entirely manually by a user, or alternatively one or more of these steps could be automated.

At step 530, the monitor tool 440 then monitors the traffic in the SUV 400, resulting in the population of the profile template at step 540 in order to produce the profile 450.

Whist one intended use of such profiles is as an input to a transactor (as for example described earlier with reference to FIGS. 1 and 2), such profiles can also be used for other purposes. For example, as will now be discussed with reference to FIGS. 8 and 9, such profiles can be used to compare the performance or behaviour of multiple views of a particular design that are subtly different. In particular, the more accurate statistical representation achieved by capturing dependencies between traffic attributes enables a more accurate comparison to be made between such multiple views of a design.

Figure 8:
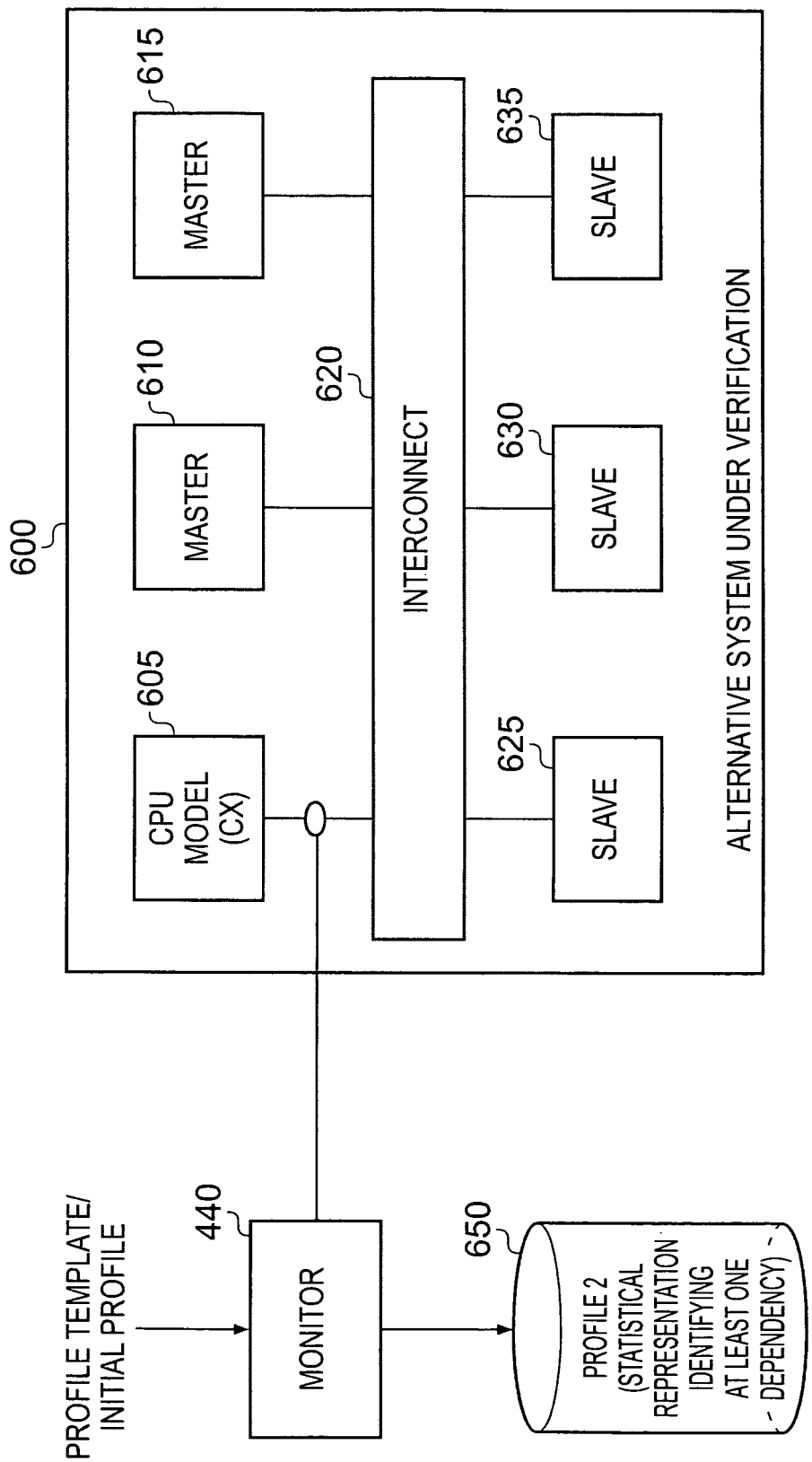
FIG. 8 is a diagram illustrating how the monitor illustrated in FIG. 6 can be used to generate an alternative profile from an alternative system under verification in accordance with one embodiment of the present invention.

Hence, as shown in FIG. 8, the monitor tool 440 can be arranged to be connected to an equivalent interface in an alternative system under verification 600, and using the same profile template or initial profile can then produce a second profile 650 based on the observed traffic flow. As with the SUV 400 shown in FIG. 6, the SUV 600 in FIG. 8 has three master devices 605, 610, 615 coupled with three slave devices 625, 630, 635 via the interconnect 620. However, in contrast to the SUV 400 in FIG. 6, the CPU model 605 used in FIG. 8 is a cycle approximate (CX) model rather than the RTL model 405 used in FIG. 6.

Figure 9:
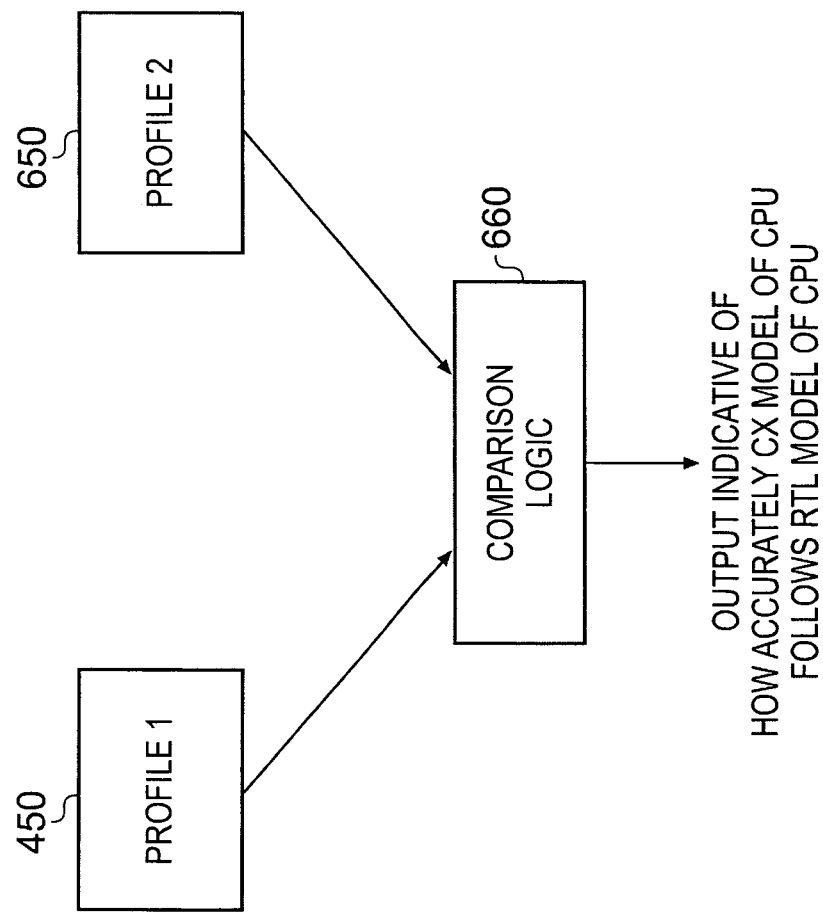
FIG. 9 schematically illustrates how the profiles generated in FIGS. 6 and 8 can be used for comparison purposes.

Once the second profile 650 has been generated, then as schematically shown in FIG. 9 the two profiles 450, 650 can be compared using comparison logic 660 in order to produce an output indicative of how accurately the cycle approximate model of the CPU follows the behaviour of the RTL model of the CPU. There are a number of ways in which the comparison logic can be implemented, but in one embodiment the comparison logic will take the form of a software routine running on a computer, and receiving the two profiles 450, 650 as its inputs.

Figure 10A:
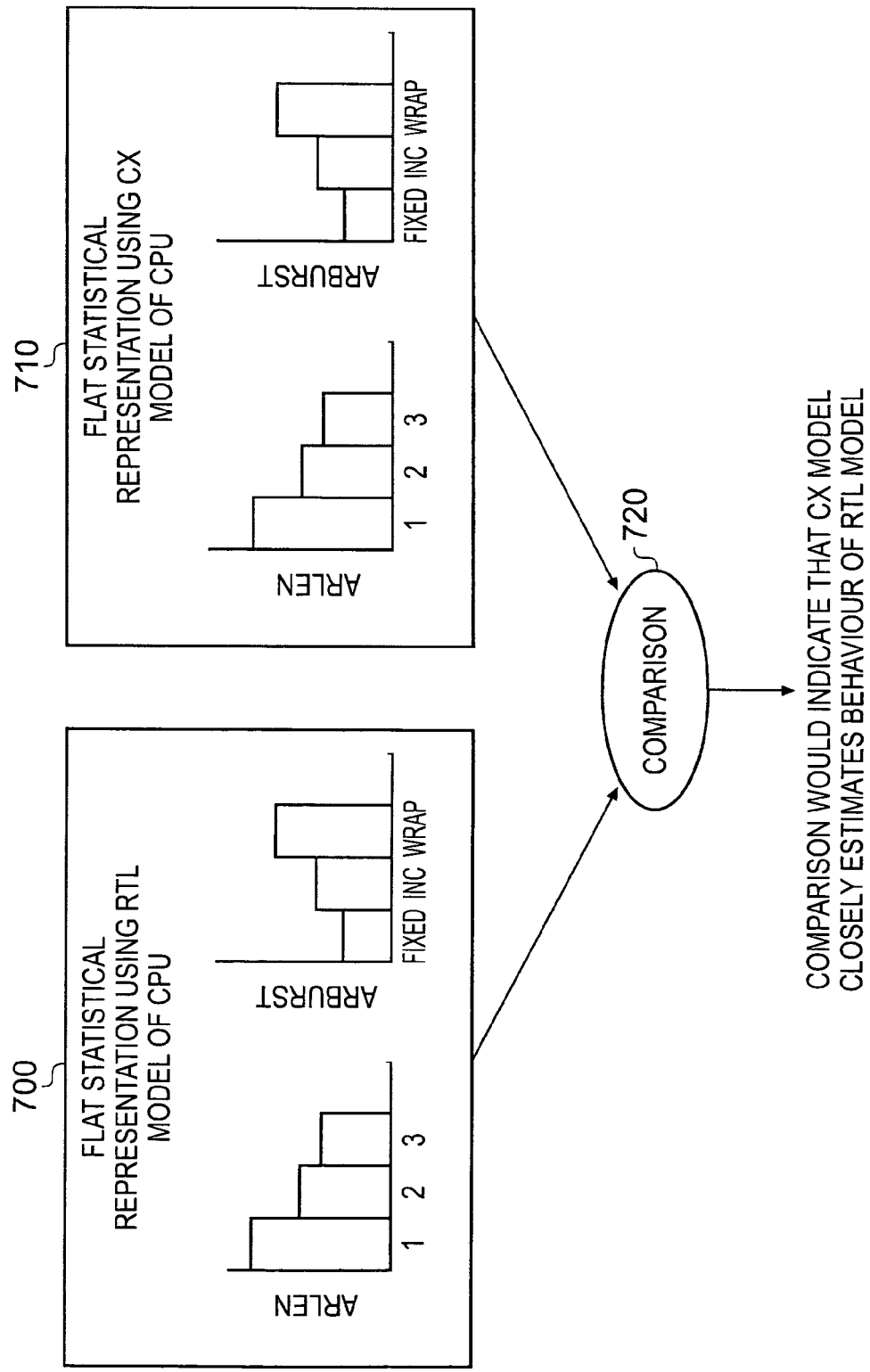
FIGS. 10A and 10B illustrate how through the comparison of profiles generated in accordance with embodiments of the present invention, discrepancies can be identified that would not be found from a comparison of flat statistical representations obtained using prior art techniques.
Figure 10B:
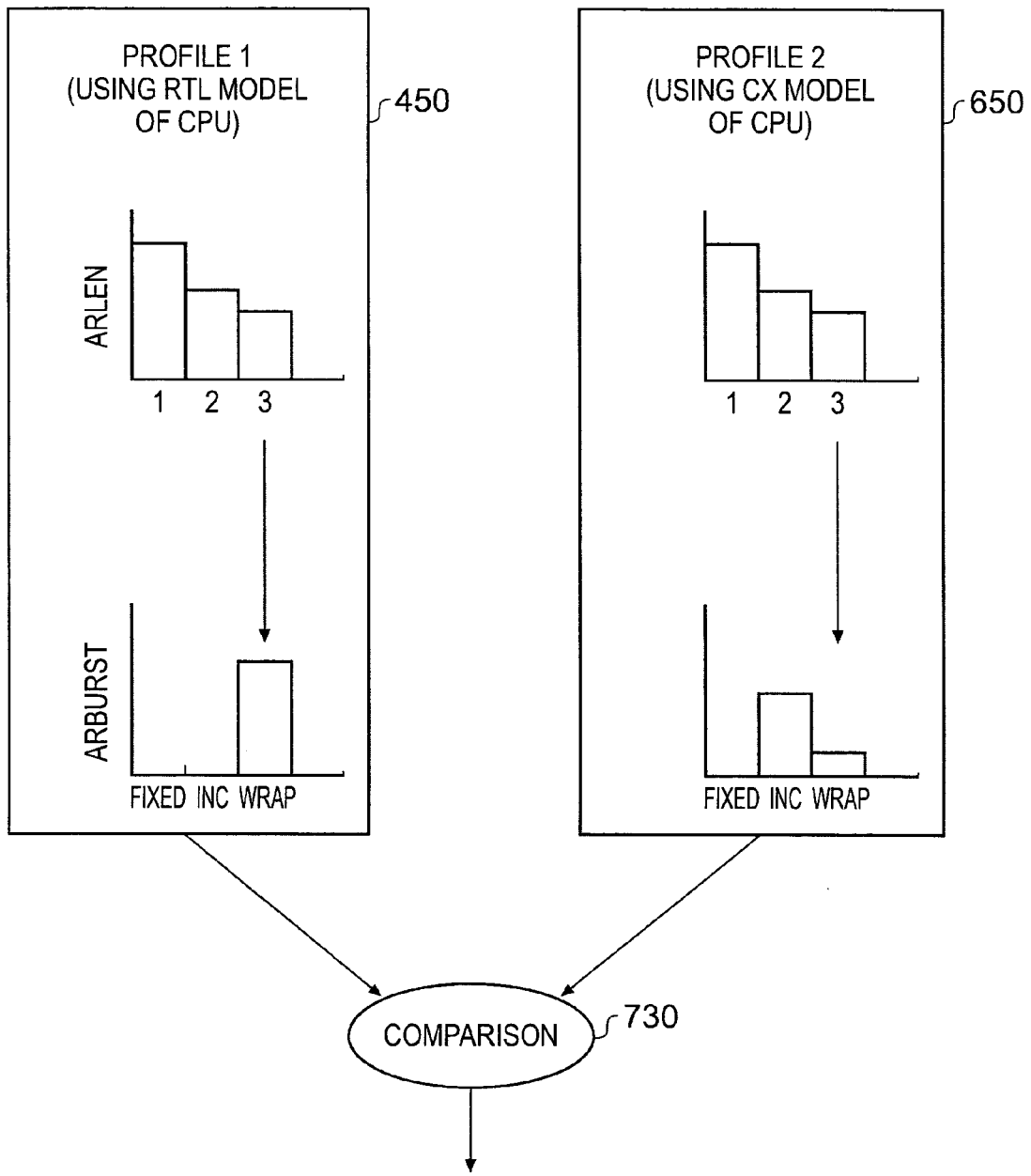

FIGS. 10A and 10B illustrate the benefits that can be achieved when comparing profiles generated in accordance with embodiments of the present invention, when compared with an alternative approach seeking to compare flat statistical representations.

In particular, as shown in FIG. 10A, two flat statistical representations of traffic flow 700, 710 are schematically illustrated, it being assumed that the flat statistical representation 700 is obtained from monitoring the interface between the RTL model 405 and the interconnect 420 in the SUV 400 of FIG. 6, whilst the flat statistical representation 710 is obtained from monitoring the equivalent interface between the cycle approximate model 605 and the interconnect 620 in the SUV 600 of FIG. 8. When the comparison 720 is performed, it will be seen that due to the similarities between the two flat statistical representations, it will be indicated that the cycle approximate model closely estimates the behaviour of the RTL model.

However, FIG. 10B illustrates the same situation, but where the two profiles 450, 650 obtained using the mechanism described with reference to FIGS. 6 and 8 are used. In this example it is assumed that burst length is chosen as the primary histogram, and burst type is dependent on burst length. In this case, when the comparison 730 is performed, it is detected that although the burst length activity is similar, accesses of a burst length of 3 actually have different burst type properties when comparing the cycle approximate model with the RTL model, thereby identifying a difference in the behaviour of the cycle approximate model when compared to the RTL model that would otherwise have gone unnoticed had flat statistical representations been used.

Another application for the profiles generated using techniques in accordance with embodiments of the present invention is in the area of error detection. Complex systems have complex behaviour. It is very difficult to enumerate all the possible failure modes, let alone detect them. Traditional error detection schemes build a set of error patterns to compare against the system. Very often this is done by hand using a detailed knowledge of the system. A detailed set of tests and responses is compiled and this then forms a fault dictionary that can be used to diagnose specific, pre-identified failures. The problem with fault patterns is that they are very specific to a particular system state that has to be reached by a special test sequence. It is therefore unsuitable for use in a normally running system.

In one embodiment of the present invention, this problem can be addressed by defining an error as any given behaviour that causes the traffic profiles in a system to diverge from those observed when the system is running correctly. The statistical nature of the earlier discussed profiles allows the inherent variability of content and timing for any particular communication to be captured, and in this way any comparison will always use the appropriate tolerance.

Figure 11:
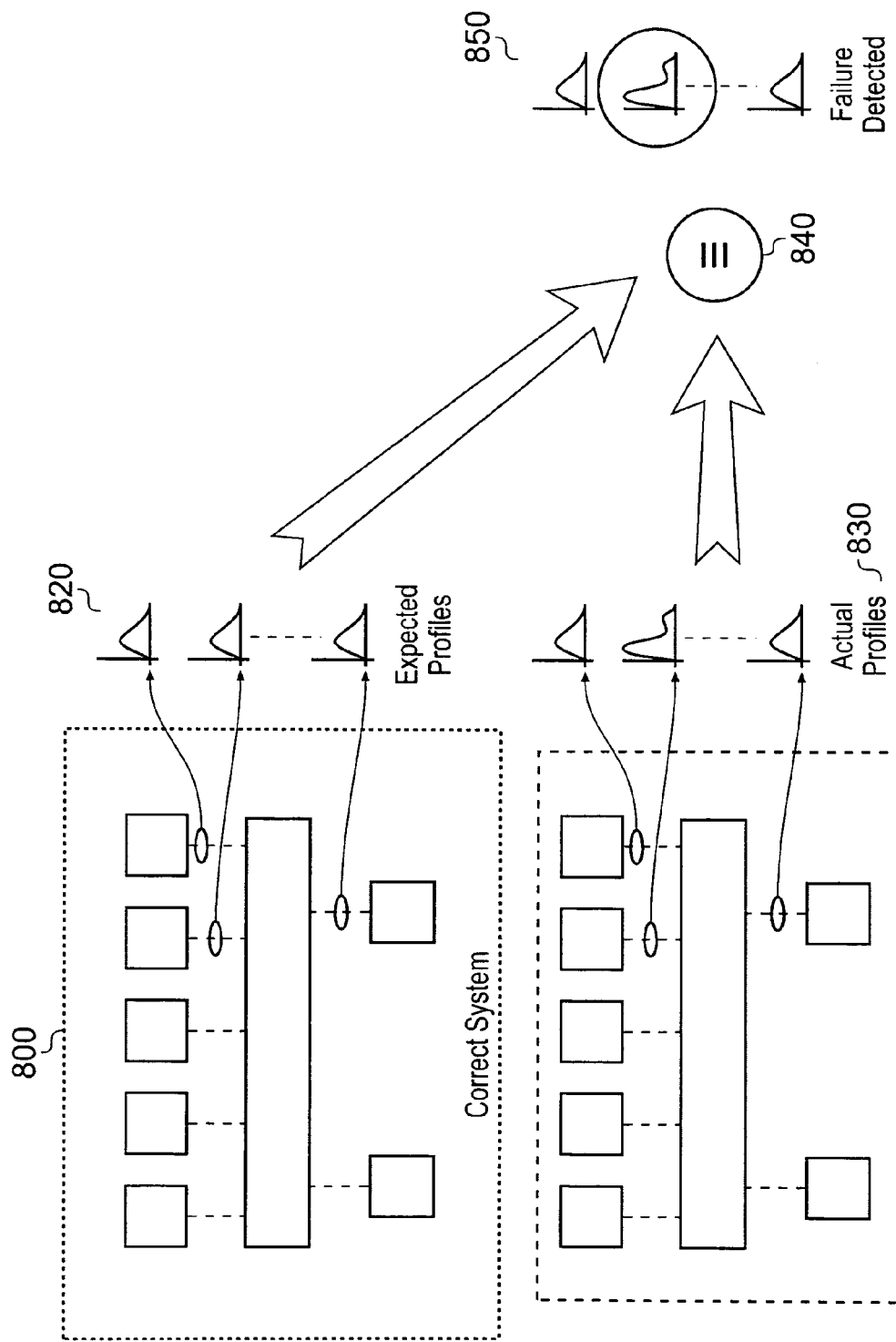
FIG. 11 is a diagram schematically illustrating a technique for using profiles in order to detect errors in a system under verification.

FIG. 11 schematically illustrates the proposed mechanism for detecting errors. Firstly, the correct system 800 is monitored in order to produce one or more profiles 820, each of those profiles employing the hierarchical structure discussed earlier, and accordingly capturing dependencies between one or more traffic attributes. These set of profiles 820 form a set of expected profiles which are to be expected from the system when operating correctly.

Incorrect behaviour of a system 810 can then be detected by producing the same set of profiles by monitoring the same interfaces as those monitored when producing the expected profiles 820, and then performing a comparison operation 840 between the actual profiles 830 produced from the system 810 and the expected profiles 820. Due to the hierarchical structure of the profiles, discrepancies between the profiles can readily be identified, allowing quick detection of failure.

Through use of such an approach, a functional simulation may be compared against its expected traffic profiles. If the actual profiles produced match the expected profiles, then the actual behaviour is considered to match the expected behaviour and the system is considered to be operating correctly. If, however, there is a miss match then the functional simulation is considered to be behaving incorrectly and an error can be flagged. The same technique can be used in the physical realisation of a design to detect undesirable system behaviour, from whatever cause, whether it be software bugs or hardware failure.

Where a system is used for a number of different applications, the sensitivity of the above described approach can be improved by using several sets of traffic profiles, each corresponding to activity during a different application.

To enable use of the above approach, it is necessary to obtain the set of expected profiles 820 from a running system 800, and in one embodiment this may be achieved using an RTL emulation of the system.

Figure 12:
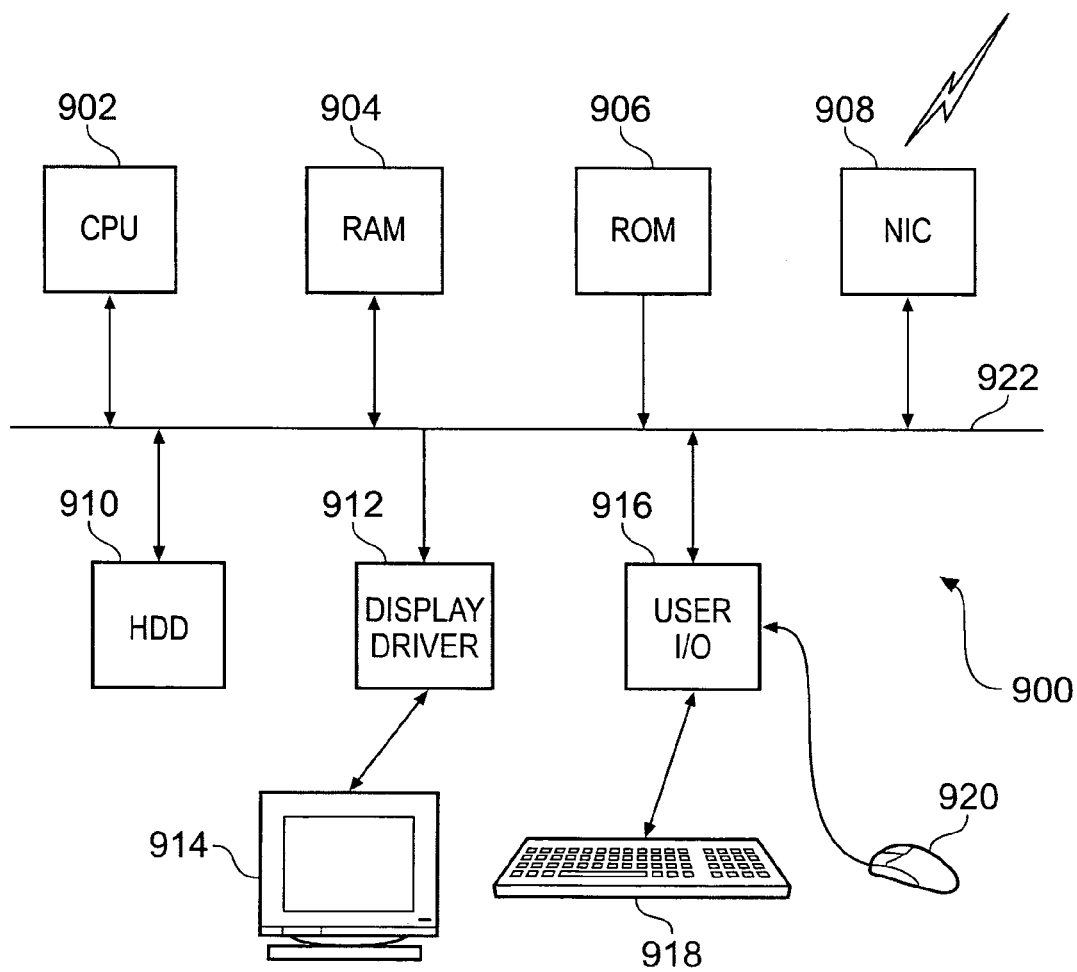
FIG. 12 is a diagram illustrating a data processing apparatus in which the techniques of embodiments of the present invention may be employed.

FIG. 12 schematically illustrates a general propose computer 900 of the type that may be used to implement the above described techniques of embodiments of the present invention. The general purpose computer 900 includes a central processing unit 902, a random access memory 904, a read only memory 906, a network interface card 908, a hard disc drive 910, a display driver 912 and monitor 914, and a user input/output circuit 916 with a keyboard 918 and mouse 920 all connected via a common bus 922. In operation, the central processing unit 902 will execute computer program instructions that may be stored in one or more of the random access memory 904, the read only memory 906 and the hard disc drive 910, or dynamically downloaded via the network interface card 908. The results of the processing performed may be displayed to a user via the display driver 912 and the monitor 914. User inputs for controlling the operation of the general purpose computer 900 may be received via the user input/output circuit 916 from the keyboard 918 or the mouse 920. It will be appreciated that the computer program could be written in a variety of computer languages. The computer program may be stored and distributed on a recording medium or dynamically downloaded to the general purpose computer 900. When operating under control of an appropriate computer program, the general purpose computer 900 can perform the above described techniques and can be considered to form an apparatus for performing the above described techniques. The architecture of the general purpose computer 900 can vary considerably and FIG. 12 is only one example.

In accordance with embodiments of the present invention, a profile is provided that employs a hierarchical structure to identify at least one dependency between traffic attributes within a statistical representation of desired traffic flow. Such profiles can be used to drive a transactor in order to cause that transactor to produce more realistic traffic flow within a system under verification. Further, such profiles can be used to more readily identify discrepancies between the operation of two different SUVs. Furthermore, such profiles can also be used to enable error detection within a SUV by detecting situations where the traffic flow observed is unexpected having regards to one of the profiles.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for performing verification tests on a system under verification representing at least part of the design of a data processing system, the apparatus implemented on a general purpose computer, said apparatus comprising:
   a transactor for connecting to an interface of the system under verification, and for generating signals for input to the system under verification via said interface during performance of said verification tests;
   profile storage for storing a profile providing a statistical representation of desired traffic flow at said interface, the statistical representation providing statistical information for a plurality of traffic attributes and identifying at least one dependency between traffic attributes in said plurality; and
   the transactor referencing said profile in order to determine the signals to be generated, such that the signals generated take account of said at least one dependency identified in the profile, wherein said profile employs a hierarchical structure to identify said at least one dependency within said statistical representation of desired traffic flow.

2. An apparatus as claimed in claim 1, wherein said hierarchical structure is a hierarchical structure of histograms, each histogram providing statistical information for one of said traffic attributes.

3. An apparatus as claimed in claim 1, wherein the desired traffic flow is representative of a traffic flow that would be expected to be observed at said interface if the transactor were replaced with a functional model or an actual component of the data processing system.

4. An apparatus as claimed in claim 3, wherein said statistical representation of desired traffic flow is obtained by monitoring traffic flow occurring when said functional model or said actual component is used.

5. An apparatus for performing verification tests on a system under verification representing at least part of the design of a data processing system, the apparatus implemented on a general purpose computer, said apparatus comprising:
   a transactor for connecting to an interface of the system under verification, and for generating signals for input to the system under verification via said interface during performance of said verification tests;
   profile storage for storing a profile providing a statistical representation of desired traffic flow at said interface, the statistical representation providing statistical information for a plurality of traffic attributes and identifying at least one dependency between traffic attributes in said plurality; and
   the transactor referencing said profile in order to determine the signals to be generated, such that the signals generated take account of said at least one dependency identified in the profile, wherein said traffic flow is produced in accordance with a transaction protocol and said plurality of traffic attributes comprise at least one transaction protocol attribute.

6. An apparatus for performing verification tests on a system under verification representing at least part of the design of a data processing system, the apparatus implemented on a general purpose computer, said apparatus comprising:
   a transactor for connecting to an interface of the system under verification, and for generating signals for input to the system under verification via said interface during performance of said verification tests;
   profile storage for storing a profile providing a statistical representation of desired traffic flow at said interface, the statistical representation providing statistical information for a plurality of traffic attributes and identifying at least one dependency between traffic attributes in said plurality; and
   the transactor referencing said profile in order to determine the signals to be generated, such that the signals generated take account of said at least one dependency identified in the profile, wherein said traffic flow is produced in accordance with a transaction protocol and said plurality of traffic attributes comprise at least one timing attribute identifying timing between particular traffic signals produced in accordance with said transaction protocol.

7. An apparatus for generating a profile providing a statistical representation of traffic flow within a data processing system, said apparatus using a system under verification representing at least part of the design of the data processing system, the apparatus implemented on a general purpose computer, said apparatus comprising:
   a monitor for connecting to an interface of the system under verification, and for observing the traffic flow at that interface; and
   the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependency between traffic attributes in said plurality, wherein said control input takes the form of a profile template setting out the plurality of traffic attributes and said at least one dependency, and the monitor produces said profile by populating the profile template based on the observed traffic flow.

8. An apparatus for generating a profile providing a statistical representation of traffic flow within a data processing system, said apparatus using a system under verification representing at least part of the design of the data processing system, the apparatus implemented on a general purpose computer, said apparatus comprising:
   a monitor for connecting to an interface of the system under verification, and for observing the traffic flow at that interface; and
   the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependency between traffic attributes in said plurality, wherein said control input takes the form of an initial profile setting out the plurality of traffic attributes and said at least one dependency, and at least partially populated with statistical information, and the monitor produces said profile by supplementing the statistical information in the initial profile based on the observed traffic flow.

9. An apparatus for generating a profile providing a statistical representation of traffic flow within a data processing system, said apparatus using a system under verification representing at least part of the design of the data processing system, the apparatus implemented on a general purpose computer, said apparatus comprising:
a monitor for connecting to an interface of the system under verification, and for observing the traffic flow at that interface;
the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependency between traffic attributes in said plurality; and
comparison logic for comparing the profile produced by the monitor with an additional profile generated for an alternative representation of the data processing system, the additional profile also providing statistical information for said plurality of traffic attributes and identifying said at least one dependency between traffic attributes in said plurality.

10. An apparatus for generating a profile providing a statistical representation of traffic flow within a data processing system, said apparatus using a system under verification representing at least part of the design of the data processing system, the apparatus implemented on a general purpose computer, said apparatus comprising:
a monitor for connecting to an interface of the system under verification, and for observing the traffic flow at that interface;
the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependency between traffic attributes in said plurality;
an alternative system under verification representing at least part of the design of the data processing system, the alternative system under verification being a different implementation of the data processing system to the system under verification;
the monitor connecting to an equivalent interface within said alternative system under verification, and observing the traffic flow at that equivalent interface in order to produce an additional profile; and
comparison logic for comparing the profile and said additional profile in order to determine differences between operation of the system under verification and the alternative system under verification.

11. An apparatus for generating a profile providing a statistical representation of traffic flow within a data processing system, said apparatus using a system under verification representing at least part of the design of the data processing system, the apparatus implemented on a general purpose computer, said apparatus comprising:
a monitor for connecting to an interface of the system under verification, and for observing the traffic flow at that interface;
the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependency between traffic attributes in said plurality; and
error detection circuitry for coupling to an interface in an additional system under verification representing at least part of the design of the data processing system in order to observe the traffic flow at that interface, the error detection circuitry having access to the profile produced by the monitor and generating an error signal when the traffic flow observed is unexpected having regard to the profile.

12. An apparatus for generating a profile providing a statistical representation of traffic flow within a data processing system, said apparatus using a system under verification representing at least part of the design of the data processing system, the apparatus implemented on a general purpose computer, said apparatus comprising:
a monitor for connecting to an interface of the system under verification, and for observing the traffic flow at that interface; and
the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependency between traffic attributes in said plurality, wherein said profile employs a hierarchical structure to identify said at least one dependency within said statistical representation of traffic flow.

13. An apparatus as claimed in claim 12, wherein said hierarchical structure is a hierarchical structure of histograms, each histogram providing statistical information for one of said traffic attributes.

14. An apparatus for generating a profile providing a statistical representation of traffic flow within a data processing system, said apparatus using a system under verification representing at least part of the design of the data processing system, the apparatus implemented on a general purpose computer, said apparatus comprising:
a monitor for connecting to an interface of the system under verification, and for observing the traffic flow at that interface; and
the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependency between traffic attributes in said plurality, wherein said traffic flow is produced in accordance with a transaction protocol and said plurality of traffic attributes comprise at least one transaction protocol attribute.

15. An apparatus for generating a profile providing a statistical representation of traffic flow within a data processing system, said apparatus using a system under verification representing at least part of the design of the data processing system, the apparatus implemented on a general purpose computer, said apparatus comprising:

a monitor for connecting to an interface of the system under verification, and for observing the traffic flow at that interface; and the monitor being responsive to a control input specifying a plurality of traffic attributes and at least one dependency between traffic attributes in said plurality, to produce said profile based on the observed traffic flow, the statistical representation of said profile providing statistical information for said plurality of traffic attributes and identifying said at least one dependency between traffic attributes in said plurality, wherein said traffic flow is produced in accordance with a transaction protocol and said plurality of traffic attributes comprise at least one timing attribute identifying timing between particular traffic signals produced in accordance with said transaction protocol.

16. A method of performing verification tests for a system under verification representing at least part of the design of a data processing system, the method comprising the steps of:

connecting a transactor to an interface of the system under verification;

during performance of said verification tests, inputting to the system under verification, via said interface, signals generated by the transactor;

storing within profile storage a profile providing a statistical representation of desired traffic flow at said interface, the statistical representation providing statistical information for a plurality of traffic attributes and identifying at least one dependency between traffic attributes in said plurality; and causing the transactor to reference said profile in order to determine the signals to be generated for input to the system under verification, such that the signals generated take account of said at least one dependency identified in the profile, wherein said traffic flow is produced in accordance with a transaction protocol and said plurality of traffic attributes comprise at least one transaction protocol attribute, wherein said method steps are implemented on a general purpose computer.

17. A computer program product comprising a non-transitory computer readable storage medium storing a computer program which when executed on a computer causes the computer to perform the method of claim 16.

18. A method of generating a profile providing a statistical representation of traffic flow within a data processing system, said method using a system under verification representing at least part of the design of a data processing system, the method comprising the steps of:

connecting a monitor to an interface of the system under verification;

observing, via the monitor, the traffic flow at that interface; and responsive to a control input specifying a plurality of traffic attributes and at least one dependency between traffic attributes in said plurality, causing the monitor to produce said profile based on the observed traffic flow, the statistical representation of said profile providing statistical information for said plurality of traffic attributes and identifying said at least one dependency between traffic attributes in said plurality, wherein said traffic flow is produced in accordance with a transaction protocol and said plurality of traffic attributes comprise at least one transaction protocol attribute, wherein said method steps are implemented on a general purpose computer.

19. A computer program product comprising a non-transitory computer readable storage medium storing a computer program which when executed on a computer causes the computer to perform the method of claim 18.

* * * * *